United States Patent [19]

Blake

[11] 4,085,544

[45] Apr. 25, 1978

[54] PLANT SUPPORTING, MOVING AND WATERING APPARATUS

[76] Inventor: Gordon William Blake, 35 Winders Ave., Tugan, Gold Coast Queensland, Australia, 4224

[21] Appl. No.: 707,197

[22] Filed: Jul. 21, 1976

[30] Foreign Application Priority Data

Jul. 25, 1975 Australia ............................ PC2508

[51] Int. Cl.² ........................................... A47G 7/00
[52] U.S. Cl. ........................................ 47/39; 47/65; 60/325; 185/4; 415/6; 417/329
[58] Field of Search .................................. 47/59–65, 47/16, 17, 79, 48.5, 89; 60/325, 495, 496; 185/4, 27; 415/5–6; 417/329

[56] References Cited

U.S. PATENT DOCUMENTS

| 1,607,884 | 11/1926 | Farley | 415/6 |
| 2,817,956 | 12/1957 | Young | 47/79 |
| 2,824,410 | 2/1958 | Daw | 47/17 X |
| 3,339,308 | 9/1967 | Clare | 47/79 |
| 3,343,300 | 9/1967 | Englert | 47/17 |
| 3,482,785 | 12/1969 | Chapin et al. | 47/79 X |
| 3,998,007 | 12/1976 | Martin | 47/39 |

FOREIGN PATENT DOCUMENTS

| 8,407 | 7/1932 | Australia | 60/325 |
| 2,406 of | 1856 | United Kingdom | 415/6 |
| 300,554 | 9/1929 | United Kingdom | 415/6 |

*Primary Examiner*—Edgar S. Burr
*Assistant Examiner*—James R. Feyrer
*Attorney, Agent, or Firm*—DeLio and Montgomery

[57] ABSTRACT

A garden arrangement including a conveyor assembly with a plurality of longitudinally spaced mounting means supporting containers utilizing growth material, the conveyor being arranged along a predetermined path whereby the containers may be successively advanced to an accessible location for tending by a gardener.

1 Claim, 5 Drawing Figures

PLANT SUPPORTING, MOVING AND WATERING APPARATUS

This invention relates to an improved garden arrangement, and in particular it relates to a garden arrangement which will advantageously utilize available floor space.

In their common form, gardens are arranged in beds which are of suitable size for convenient tending by a gardener. As a result, persons living in home units and other places where sufficient land is not available for making gardens are often denied the pleasure of gardening. Also, such persons are prevented from growing their own vegetables and are thus reliant upon others for the supply of fresh vegetables. It has long been recognized that it is very desirable for persons to own and tend their own gardens, but it has not up to the present been practical for many persons to do so.

Furthermore, there have been prior proposals to mechanize gardening on a large industrial scale, but todate such attempts have not been overwhelmingly successful. This is thought to be partly because of the artificial nature of the prior arrangements and partly because it has not been economically possible to maintain the growth medium and the water supply in prime condition to achieve the desired growth results. As a result, vegetables produced by such method have not been able to compete with normally grown vegetables.

It is thus an object of the present invention to provide a garden arrangement which will overcome the above and other disadvantages and which will prove reliable and efficient in operation. Other objects and advantages of the invention will become apparent from the following description.

With the foregoing and other objects in view, this invention resides broadly in a garden arrangement including a conveyer assembly having mounted thereon a plurality of longitudinally spaced apart mounting means each adapted to support a container for growth material in such manner that each container is maintained in a material-containing attitude, and said conveyer assembly being arranged for movement along a predetermined path whereby the said containers are successively advanced to an accessible location for tending by a gardener.

Preferably, the conveyer assembly is a rotary conveyer rotatable about a horizontal axis and the mounting means comprise gimball mounting arrangements for pivotally supporting the respective containers in their material-containing attitude. It is also preferred that the rotary conveyer be provided with a plurality of circumferentially spaced water containers operatively associated with water supply means and flow control valve means so that water is maintained only in the water containers disposed at one side of the vertical plane passing through the axis of rotation of the rotary conveyer so as to provide a turning moment to rotate said conveyer.

In order that the invention may be more readily understood and put into practical effect, reference will now be made to the accompanying drawings which illustrate the preferred embodiment of a garden arrangement according to the present invention and wherein.

Figure 1:
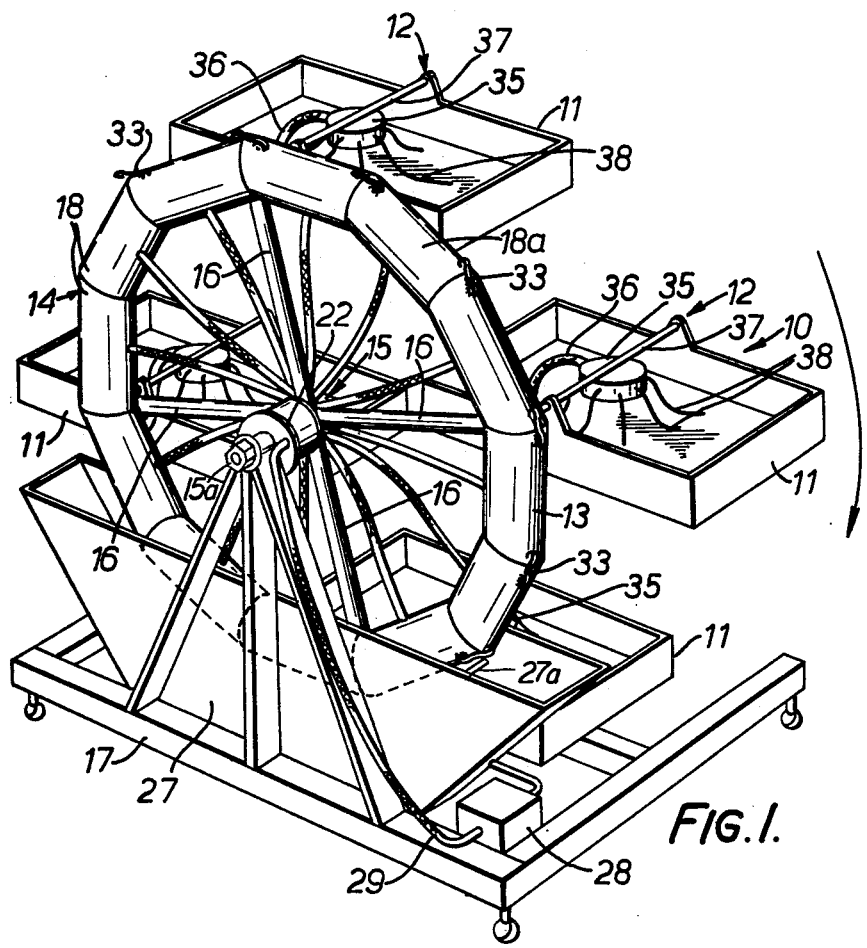
FIG. 1 is a perspective view of a domestic garden arrangement made in accordance with the present invention.
Figure 2:
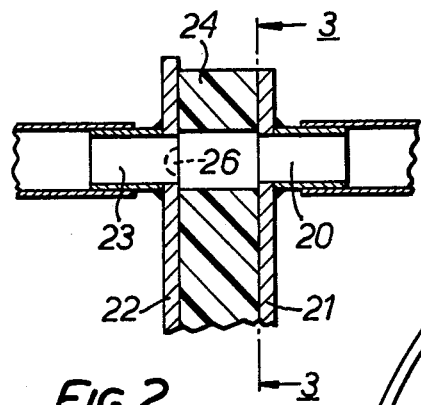
FIG 2 is a cross-sectional view through the outer portion of the hub assembly of the embodiment illustrated in FIG. 1.
Figure 3:
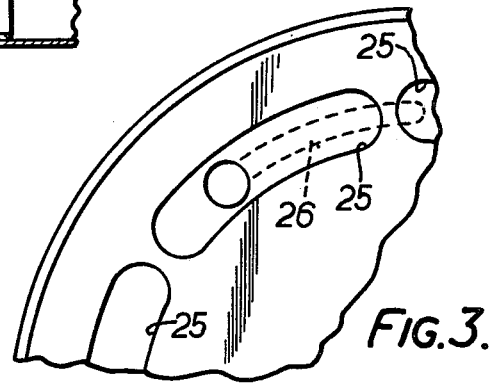
FIG. 3 is a cross-sectional view along the line 3—3 of FIG. 2.

As shown in FIG. 1, the garden arrangement 10 comprises four containers 11 for growth material and supported by gimball mounting means 12 from spaced locations on the rim 13 of a driving wheel assembly 14. As shown, the rim 13 of the driving wheel assembly is supported from the hub 15 by four spokes 16 and the hub 15 is itself journalled in cantilever manner on a stub-axle at the upper central portion of the mobile support frame 17.

Figure 4:
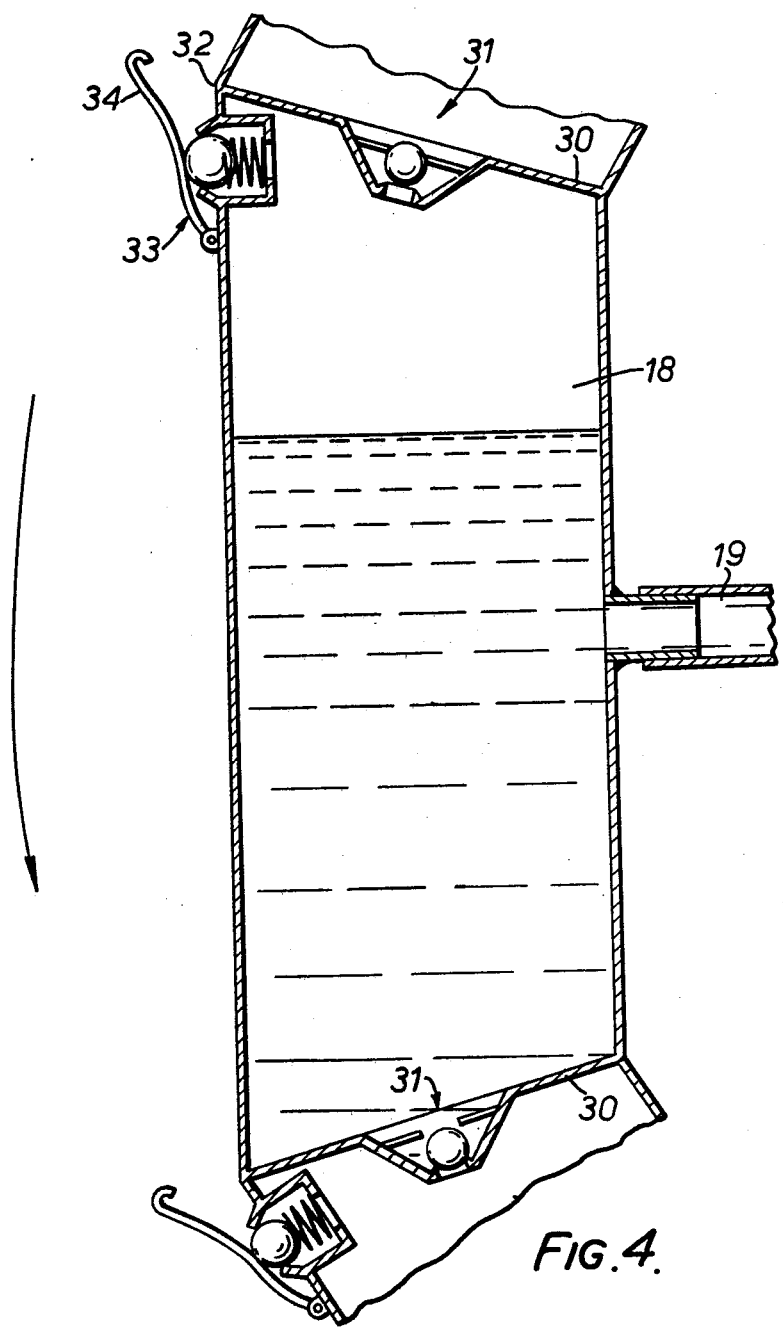
FIG. 4 is a cross-sectional view of one segment of the wheel rim of FIG. 1.

In this embodiment, the rim 13 comprises twelve elongate segments 18, one of which is illustrated in detail in FIG. 4, and each segment 18 is connected by a transfer hose 19 to a respective one of outlet pipe stubs 20, spaced circumferentially around the outwardly extending flange portion 21 of the hub 15. This flange 21 is similar to a flange 22 fixed to the stub-axle and the flange 22 is provided with a single inlet pipe stub 23 spaced radially the same distance from the center line of the stub-axle as are the spaced outlet pipe stubs 20. Sandwiched between the respective flanges 21 and 22 is a thick nylon gasket 24 which is fixed for rotation with the flange 21. This gasket 24 is provided with arcuate elongate cutouts 25 which extend therethrough and each cutout 25 communicates with a respective outlet pipe stub 20. In this manner, as the drive wheel assembly 14 rotates, the outlet pipe stubs 20 are placed in communication consecutively with the inlet pipe stub 23, through the respective cutout 25 in the gasket 24. The length of the cutout can be made as desired to achieve the desired duration of water supply to the respective transfer hose. However, this may be increased if desired by providing a lead-in trough, shown in dotted outline at 26, in the flange 22 and communicating with the inlet pipe stub 23.

It will be seen from FIG. 1 that the inlet pipe stub 23 is disposed in the upper segment of the flange 22 and to one side of the vertical plane passing through the center line of the support axle, and that the lower portion of the wheel passes through a holding tank assembly 27 from which water may be supplied by the pump 28 through the supply tube 29 to the inlet pipe stub 23.

Thus, in operation, water is supplied to the sector 18a to one side of the uppermost sector. As shown in FIG. 4, each sector 18 is of substantially hollow form and includes in each end plate 30 a non-return valve assembly 31 which permits through-flow in an upward direction in the water-containing side of the wheel, but not in the reverse direction. Thus, water supplied to the segment 18a can fill this segment, the lower ball valve assembly preventing escape of water into the lower segment and the upper ball valve assembly 31 providing an air escape to enable water, which is supplied at low pressure and volume, to enter the segment. At the trailing end 32 of each segment there is provided a normally-closed lever-operated ball-valve assembly 33. As shown, the operating lever 34 extends outwardly past the outer perimeter of the rim segment 18 and is adapted in operation to engage with a striking bar 27a disposed in the lower portion of the holding tank 27. Thus, as the drive-wheel assembly rotates the levers 34 successively strike the striking bar 27a and allow the contents of the respective segments to empty into the holding tank prior to passing to the opposite side of the drive-wheel assembly. Thus, the segments on the uphill side of the rim are maintained in an empty condition.

The drive-wheel assembly 14 rotates due to the turning moment created by the weight of water in the segments on one side of the wheel. As the wheel rotates, the next-uppermost segment 18a begins to fill with water. Filling continues while there is communication between the outlet stub pipe 20 and the inlet stub pipe 23. When the wheel rotates sufficiently to prevent communication, the segment is retained full of water until its lever-operated ball valve 33 spills the contents therefrom into the holding tank 27. The rate of rotation of the wheel may be adjusted by varying the tension in the lock-bolt 15a retaining the hub 15 to the stub-axle.

As the tension is increased, the gasket 24 is more firmly retained between the flanges 21 and 22 and acts as a brake against the rotational torque provided by the unbalanced wheel rim. Also, such engagement between the flanges 21 and 22 prevents leakage of water from the inlet stub around the junction of the flanges 21 and 22 and the gasket 24. The rate of rotation of the driving wheel assembly may be controlled also by varying the feed-water rate and for this purpose only a very small pump is required, just sufficient to overcome the head of water in the connecting pipe 29 and the transfer pipe 19. Thus, the running cost of the garden arrangement is very low.

Each container 11 is provided with a float valve controlled holding tank 35 which is supplied with water from the adjacent segment 18 via an inlet tube 36 which communicates with the respective segment through a gland fitting on the respective horizontally extending support shaft 37. Thus, water is supplied to the tank 35 only while the adjacent sector 18 is filled with water. As shown, there are provided a plurality of small-bore tubes 38 extending from each tank to a portion of the container containing growth-material so that water is distributed evenly without wastage and to all parts of the growth material. This cyclic watering feature enhances the ability of the growth material to support plant life.

One of the advantages provided by the above apparatus is that the plants are watered from a recycled water supply which is being constantly aerated, partly as a result of passage through the growth material, and partly as a result of turbulence created at discharge of each segment. If desired, each container 11 may be provided with a lever-operated ball-valve similar to the valve 33 in the controlling end of each segment for releasing excess water when the container has reached its lowermost attitude. For this purpose, the holding tank includes an open portion to receive the excess spillage from each container. As the water is aerated and as it is not in prolonged contact with the atmosphere the growth of algae is greatly reduced. The overall result is that the plants are fed with clean aerated water which again greatly enhances the potential of the growth material for supporting crops. The water is also kept clean by its being filtered through the respective garden beds before being returned as overflow to the holding tank assembly 27. Of course, separate filtering arrangements may be used, and if desired, fertilizer can be put into the water supply for automatic distribution.

Thus, in the above described embodiment, the garden is self-contained apart from requiring occasional weeding, the growth of which will be greatly reduced by the controlled condition of operation and by the recycled supply of clean water. Also, the running expenses of the machine will be very light as only a very small pump is required to feed the small amounts of water necessary to cause slow rotation of the drive wheel assembly 14. As the drive wheel assembly 14 rotates the containers 11 are successively advanced to a position where each bed may be conveniently tended by a gardener. Thus, not only is it possible to provide a garden area greater than the floor area of the apparatus, but it is also possible to provide such increase in capacity with the convenience that each bed is successively advanced to a position where it may be easily tended. Of course, this feature may be further utilized by supporting the garden in a normally inaccessible location, but arranged for placing one garden bed at a time at a convenient location for tending.

Figure 5:
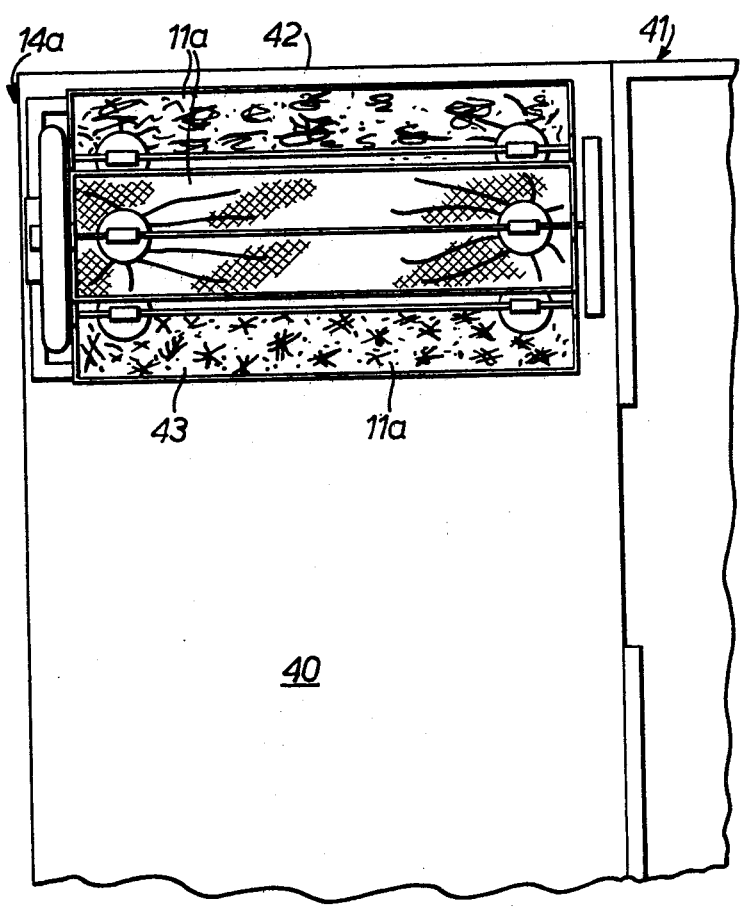
FIG. 5 is a plan view showing the arrangements of a garden according to the present invention at one end of an outdoor patio of a dwelling.

In the embodiment shown in FIG. 5, the containers 11a extend substantially across the width of a patio 40 of, say, a home unit 41, a corner of which is shown. As shown, one end of the containers 11a is supported on and driven by a drive wheel assembly 14a while their other ends are supported on a freely-rotatable hub assembly. It will be seen that the area of the garden beds in the containers 11a is approximately twice the floor area covered by the device. Of course, more or less beds could be used as desired. Not only this, but the container 11a is moved successively from a remote position adjacent the end 42 of the patio 40 to a convenient waist-high location at 43 for tending by the gardener or occupant of the home unit. For this purpose, the rate of rotation is such that movement of the beds is just visible and will allow the gardener sufficient time at the convenient location for his tending.

Preferably, the garden arrangement is supported on a wheel frame whereby said garden arrangement may be moved from one position to another to enable the garden arrangement to be disposed for optimum use of ambient conditions.

On a commercial scale, similar assemblies could be arranged in rows of spaced adjacent pairs extending across the full width of a building. In cold countries, during winter, it would be possible to arrange the gardens indoors and to heat their water supply so that vegetables could be grown throughout the winter. In such an arrangement, the actual areas of the garden beds provided would be much larger than the floor area of the room and again, the invention provides the convenience that the beds are successively advanced in turn to an area where they may be easily tended by the gardener.

Of course, other conveyer means other than rotary conveyers may be used and if desired, the water wheel drive arrangement could be substituted by an electric motor or other suitable drive means. However, in such cases, the costs of operating the garden arrangement would be increased. The drive-wheel segments could be moulded from plastic and clipped together to form the water-wheel. The support frame for the garden containers could be a separate structure adapted to support tanks of water for drive purposes in the above described manner and, say, disposed in the base of each container for growth material. Various supply and flow control arrangements could be provided to ensure the desired operation. Additionally, the conveyer supporting the containers need not necessarily be a rotary conveyer as described.

I claim:

1. A garden arrangement including a conveyer assembly having mounted thereon a plurality of longitudinally spaced apart mounting means each adapted to support a container for growth material in such manner that each container is maintained in a material-containing attitude, and said conveyer assembly being arranged for movement along a predetermined path whereby the said containers are successively advanced to an accessible location for tending by a gardener, said conveyer assembly being a rotary conveyer rotatable about a horizontal axis and each said mounting means comprising a gimball mounting arrangement for pivotally supporting the respective container in said material-containing attitude, said rotary conveyer being provided with a plurality of circumferentially spaced water containers operatively associated with water supply means and flow control valve means in such manner that water is maintained only in the said water containers which are disposed at one side of the vertical plane passing through the axis of rotation of said rotary conveyer so as to provide a turning moment about said axis to rotate said conveyer, each said water container being constituted by a segment of the hollow annular rim disposed concentrically about said axis and connected to said rotary conveyer for movement therewith, the dividing wall between each adjacent pair of rim-segments including a one-way valve which, when said segments are disposed at said one side, prevents water flowing downwards from one segment to the next whereby each said segment may successively fill with water from a water inlet communicating through an axially disposed gland fitting with said water supply means, and each said segment having a normally closed trip valve means adapted to cooperate with a trip member adjacent the lowermost portion of said rim to open said trip valve means to sequentially spill water from said segments as the latter reach their lower position.

* * * * *